US006650765B1

(12) United States Patent
Alves

(10) Patent No.: US 6,650,765 B1
(45) Date of Patent: Nov. 18, 2003

(54) SYSTEM FOR SIMULTANEOUSLY IMAGING VEHICLES AND THEIR LICENSE PLATES

(75) Inventor: James Francis Alves, San Diego, CA (US)

(73) Assignee: Pulnix America, Inc., Sunnyvale, CA (US)

( * ) Notice: Subject to any disclaimer, the term of this patent is extended or adjusted under 35 U.S.C. 154(b) by 0 days.

(21) Appl. No.: 09/481,132

(22) Filed: Jan. 11, 2000

(51) Int. Cl.[7] ............................ G06K 9/00; G08G 1/01
(52) U.S. Cl. ....................................... 382/105; 340/933
(58) Field of Search .......................................... 382/105

(56) References Cited

U.S. PATENT DOCUMENTS

| | | | | |
|---|---|---|---|---|
| 4,491,923 A | * | 1/1985 | Look | 348/148 |
| 4,731,854 A | * | 3/1988 | Gonzalez | 348/148 |
| 5,591,972 A | | 1/1997 | Noble et al. | 250/330 |
| 5,915,032 A | * | 6/1999 | Look | 382/100 |
| 6,121,898 A | * | 9/2000 | Moetteli | 340/905 |
| 6,367,949 B1 | * | 4/2002 | Pederson | 362/240 |

FOREIGN PATENT DOCUMENTS

| | | | |
|---|---|---|---|
| GB | 2328731 | * | 3/1999 |

* cited by examiner

*Primary Examiner*—Leo Boudreau
*Assistant Examiner*—Hussein Akhavannik
(74) *Attorney, Agent, or Firm*—Thomas E. Schatzel; Law Offices of Thomas E. Schatzel, A Prof. Corp.

(57) ABSTRACT

A vehicle video imaging system comprises a white-light LED array for illuminating retro-reflective painted parts of a vehicle's license plate, a powerful flash with a visual spectrum cutout filter and a polarizing filter for illuminating any non-retro-reflective license plate paint and the vehicle itself. A video camera with a polarizing filter turned 90° relative to the one in front of the flash receives the illuminated image of the vehicle and its license plate. The retro-reflective paint of a license plate will return polarized light as it is received, so the white-light LED array will provide all the illumination needed by the camera to get a good high-contrast picture of the license plate. The polarizing filters will combine to block out most of the light from the flash that was returned still-polarized by the retro-reflective-paint license plate. All other surfaces that do not have retro-reflective paint will bounce-back and scatter the light from both the polarized flash and non-polarized light.

12 Claims, 1 Drawing Sheet

SYSTEM FOR SIMULTANEOUSLY IMAGING VEHICLES AND THEIR LICENSE PLATES

FIELD OF THE INVENTION

Figure 1:
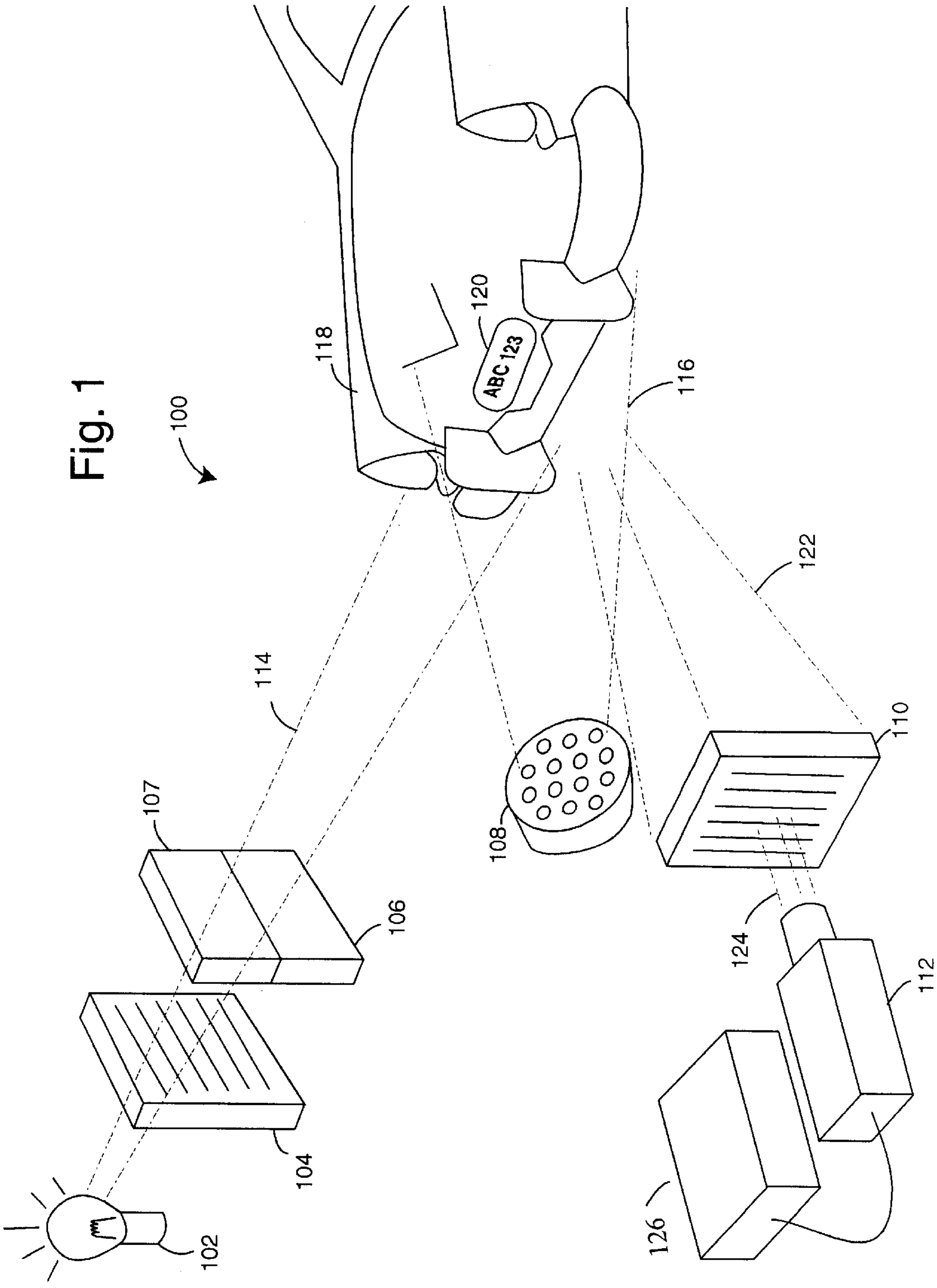

The present invention relates to computer recognition systems, and more particularly to systems that record the passing of a vehicle at one camera location and then recognize the same vehicle passing a second camera at another location.

DESCRIPTION OF THE PRIOR ART

A few commercial systems have become available for detecting traffic violations and imaging cars involved in the violation. A video image or photograph that clearly shows the vehicle involved and its license plate is needed to sustain a conviction in court. This is more difficult to accomplish than may be thought because lighting conditions can vary greatly and cameras usually have a very limited dynamic range. The contrasting color choices made by the states and other governments add to the problem, and so white light is necessary to gain a high contrast picture under all color combinations.

For example, the Pulnix America, Inc. (Sunnyvale, Calif.) markets a vehicle imaging system (VIS) that is a low-cost imaging solution for violation enforcement systems, speeding, red light, bus lane, railroad crossing, automatic license plate readers, electronic toll collection, and lane-based open road video billing. Such VIS must produce legible images of passing vehicles and their license plates under all weather and lighting conditions. Retro-reflective and non-retro-reflective plates, including older plates with diminished retro-reflective properties, are imaged by the VIS day or night. Unlike most other imaging systems, the VIS is said to adapt instantly to changing lighting conditions and ignore road reflections. It focuses instead on what is important, the brightness of the car and its plate by using a smart light sensor. Such measures the instantaneous dynamic range of plate/vehicle brightness and electronically adapts camera parameters, e.g., gain and shutter speed, to achieve optimal imaging of the vehicle and its license plate.

In order to achieve the highest levels of accuracy in detection, these cameras must have high speed electronic shutters, high resolution, high frame rate, and communication capabilities. A progressive scan interline transfer CCD-type camera, with its high speed electronic shutter and resolution capabilities, provides the basic functions to meet the requirements of a traffic camera system. Traffic cameras must deal with harsh environmental conditions and an extremely wide range of light.

Optical character recognition (OCR) is a critical function of a modern traffic camera system, with detection and accuracy heavily dependent on the camera function. In order to operate under demanding conditions, communication and functional optimization is implemented to control cameras from a roadside computer. The camera operates with a shutter speed faster than 1/2000 second to capture highway traffic both day and night. Consequently camera gain, pedestal level, shutter speed and gamma functions are conventionally controlled by a look-up table containing various parameters based on environmental conditions, particularly lighting. Lighting conditions are studied carefully, to focus only on reading the critical license plate surface.

SUMMARY OF THE INVENTION

It is therefore an object of the present invention to provide a vehicle video imaging system that can produce clear pictures of a vehicle and its license plate.

It is a further object of the present invention to provide a vehicle video imaging system that automatically adjusts for retro-reflective and non-retro-reflective license plates on a vehicle being imaged.

Briefly, a vehicle video imaging system embodiment of the present invention comprises a white-light LED array for illuminating retro-reflective painted parts of a vehicle's license plate, a powerful flash with a visual spectrum cutout filter and a polarizing filter for illuminating any non-retro-reflective license plate paint and the vehicle itself. A video camera with a polarizing filter turned 90° relative to the one in front of the flash receives the illuminated image of the vehicle and its license plate. The retro-reflective paint of a license plate will return polarized light as it is received, so the white-light LED array will provide all the illumination needed by the camera to get a good high-contrast picture of the license plate. The polarizing filters will combine to block out most of the light from the flash that was returned still-polarized by the retro-reflective-paint license plate. All other surfaces that do not have retro-reflective paint will bounce-back and scatter the light from both the polarized flash and non-polarized light.

An advantage of the present invention is that an imaging system is provided that produces good contrast pictures of vehicles and their license plates.

These and other objects and advantages of the present invention will no doubt become obvious to those of ordinary skill in the art after having read the following detailed description of the preferred embodiments which are illustrated in the drawing figure.

IN THE DRAWINGS

FIG. 1 is a diagram of a vehicle video imaging system embodiment of the present invention.

DETAILED DESCRIPTION OF THE PREFERRED EMBODIMENT

A vehicle video imaging system embodiment of the present invention is illustrated in FIG. 1 and is referred to herein by the general reference numeral 100. The system 100 includes a flash lamp 102 that is placed behind a polarizing filter 104 and two different color visible-spectrum filters 106 and 107. Two filters can allow two colors and wavelengths to be used to better illuminate the license plate. In particular, the filters 106 and 107 should block all light that a human driver of a vehicle would see at night, e.g., light with wavelengths of 400–700 nanometers. A floodlight 108 provides a less intense source of illumination than the flash lamp 102, and is preferred to be a white-light light-emitting-diode (LED) array. A similar, but non-white-light, LED array for use in the video imaging of cars is described by J. Donald Noble, et al., in U.S. Pat. No. 5,591,972, issued Jan. 7, 1997. Such Patent is incorporated herein by reference. A second polarizing filter-110 is oriented orthogonally to that of polarizing filter 104 so that any polarized light from the flash lamp 102 that remains polarized will be blocked. But polarized light from the flash lamp 102 that does not remain polarized after being reflected from some surface will not be blocked. A video camera 112 receives its images through the second polarizing filter 110.

A flash-illumination 114 will thus be polarized and filtered of any light with wavelengths of 400–700 nanometers. Such light 114 could predominate with infrared or ultraviolet, or both. The point is that it be polarized, of strong intensity, and not discernable to the human eye. A flood-illumination 116 is used to light up a vehicle 118 and its license plate 120.

Such light 116 will in particular light-up the license plate 120 for the video camera 112 if the license plate includes retro-reflective paints. But the intensity of light 116 is not great enough to properly illuminate the vehicle 118 or a non-retro-reflective-paint license plate 120.

The flash-illumination light 114 is thus needed to properly illuminate the vehicle 118 and any non-retro-reflective-paint license plate 120. Retro-reflective paint as used on license plates has the property of not disturbing the polarization of any polarized light it reflects. So flash-illumination 114 will be returned in a reflected light 122 with its original polarization from the retro-reflective-paint license plate 120. The other non-retro-reflective paint surfaces of the vehicle 118 and license plate 120 will scatter polarized and non-polarized light and produce a non-polarized light component in light 122.

Any polarized light in light 122 with the polarization of polarizing filter 104 will be blocked by polarizing filter 110 and produce a filtered image light 124. The net effect of this is a retro-reflective-painted license plate 120 will not cause a glare that would drop the image of the rest of the vehicle 118 out of the picture produced by video camera 112. This is important because a computer 126 is attached to receive such images and determine violations of vehicle law and issue tickets. Proving the violation in court requires a clear, high contrast image of both the vehicle 118 and its license plate 120. Such computer 126 may alternatively include optical character recognition (OCR) software programs for the automatic robotic reading of any alphanumeric characters on the face of license plate 120.

In general, vehicle and license plate imaging system embodiments of the present invention include a video camera for providing an image of a vehicle and a license plate. A first polarizing filter is mounted in front of the video camera and has a first polarizing orientation such that any light from the vehicle and license plate is polarized before reaching the video camera. A floodlight illuminates the vehicle and license plate for the video camera. A flash lamp with an instantaneous light output that exceeds that of the floodlight outputs a flash illumination of the vehicle and license plate for the video camera. A visual-spectrum cutout filter is placed in front of the flash lamp and provides for a blockage of human-visible light spectra from the flash lamp that would otherwise reach the vehicle and license plate and be seen by the video camera. A second polarizing filter is mounted in front of the video camera and has a second polarizing orientation that is orthogonal to the first polarizing orientation. So, a reflected light from the flash lamp with the second polarizing orientation that is returned from the vehicle and license plate is blocked by the first polarizing filter. The visual-spectrum cutout filter preferably blocks visible-spectrum light with wavelengths in the range of 400–700 nanometers. The floodlight preferably comprises a white-light light-emitting-diode (LED) array.

A computer system can be connected to the video camera and provide automatic optical character recognition of any alphanumeric characters that are imaged from the license plate. Also, such computer system connected to the video camera can determine and issue traffic citations for any vehicle law violations involving the vehicle.

In alternative embodiments of the present invention, vehicle and license plate imaging systems have a video camera for imaging vehicles and their retro-reflective-paint license plates. A first polarizing filter is mounted in front of the video camera and has a first polarizing orientation such that any polarized light from the retro-reflective-paint license plate may be filtered out before reaching the video camera. A white-light light-emitting-diode (LED) array is used for a non-polarized illumination of the vehicle and retro-reflective-paint license plate for the video camera. A flash lamp flash-illuminates the vehicle and its retro-reflective-paint license plate for the video camera. A visual-spectrum cutout filter is placed in front of the flash lamp and providing for a blockage of human-visible light spectra from the flash lamp that would otherwise reach the vehicle and retro-reflective-paint license plate and be seen by the video camera. Then, a second polarizing filter mounted in front of the video camera uses a second polarizing orientation that is orthogonal to the first polarizing orientation. Thus, a reflected light from the flash lamp with the second polarizing orientation that is returned from the retro-reflective-paint license plate is blocked by the first polarizing filter, and a reflected light from the LED array with no particular polarization that is returned from the retro-reflective-paint license plate reaches the video camera without substantial attenuation by the first polarizing filter.

A method embodiment of the present invention provides for simultaneous imaging a vehicle and its license plate when such license plate may or may not be painted with retro-reflective paints and can comprise any number of contrasting colors. The method comprises the steps of flood-illuminating a vehicle and its license plate with a non-polarized light sufficient to return a usable visible image from a retro-reflective-paint license plate. Then flash-illuminating the vehicle and its license plate with a polarized light sufficient to return a usable visible image from the vehicle and any non-retro-reflective-painted license plate. This is followed by a filtering out of any of the polarized light returned from the vehicle and its license plate before imaging with a camera. The step of filtering can be such that a polarizing filter is used that is orthogonally oriented to the polarized light. The step of flood-illuminating preferably uses a white-light light-emitting-diode (LED) array. The step of flash-illuminating may also include the use of a visible-light filter that blocks light with wavelengths in the range of 400–700 nanometers.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A vehicle and license plate imaging system, comprising:

a video camera for providing an image of a vehicle and a license plate in the dark and at night, and in which it is unknown if said license plate will be non-retro-reflective or retro-reflective;

a first polarizing filter mounted in front of the video camera and having a first polarizing orientation;

a low-level floodlight for providing an illumination of said vehicle and license plate for the video camera;

a flash lamp providing for a flash illumination of said vehicle and license plate for the video camera;

a visual-spectrum cutout filter placed between the flash lamp and said vehicle, and providing for a blockage of human-visible light spectra that would otherwise reach said vehicle, and providing for a combination of a first light with wavelengths less than 400 nanometers and a second light with wavelengths more than 700 nanometers at the fringes of the visible spectrum to contrast a variety of color combinations used in said license plate;

a second polarizing filter placed between the flash lamp and said vehicle, and having a second polarizing orientation that is orthogonal to said first polarizing orientation and providing for cross Polarization of said flash illumination;

wherein, a reflected light from the flash lamp with said second polarizing orientation that is returned from said vehicle and license plate is blocked by the first polarizing filter; and wherein, the low-level floodlight is able to provide sufficient illumination for the camera if said license plate is a retro-reflective type.

2. The system of claim 1, wherein:

the visual-spectrum cutout filter blocks visible-spectrum light with wavelengths in the range of 400–700 nanometers.

3. The system of claim 1, wherein:

the floodlight comprises a white-light light-emitting-diode (LED) array.

4. The system of claim 1, further comprising:

a computer system connected to the video camera for providing automatic optical character recognition of any alphanumeric characters that are imaged from said license plate.

5. The system of claim 1, further comprising:

a computer system connected to the video camera for determining and issuing traffic citations for any vehicle law violations involving said vehicle.

6. A vehicle and license plate imaging system, comprising:

a video camera for providing an image of a vehicle and a reflective-paint license plate;

a first polarizing filter mounted in front of the video camera and having a first polarizing orientation;

a white-light light-emitting-diode (LED) array for providing a non-polarized illumination of said vehicle and reflective-paint license plate for the video camera;

a flash lamp for providing a flash illumination of said vehicle and reflective-paint license plate for the video camera;

a visual-spectrum cutout filter placed between the flash lamp and said vehicle and providing for a blockage of human-visible light spectra from the flash lamp that would otherwise reach said vehicle, and providing for a combination of a first light with wavelengths less than 400 nanometers and a second light with wavelengths more than 700 nanometers at the fringes of the visible spectrum to contrast a variety of color combinations used in said license plate; and a second polarizing filter placed between the flash lamp and said vehicle, and having a second polarizing orientation that is orthogonal to said first polarizing orientation;

wherein, any light from the flash lamp with said second polarizing orientation that is returned from said vehicle and said retro-reflective-paint license plate is substantially blocked by the first polarizing filter, and light with no particular polarization that is returned from said vehicle and said retro-reflective-paint license plate can substantially pass by the first polarizing filter; and wherein, the white-light LED array is able to provide sufficient illumination for the camera if said license plate is a retro-reflective type.

7. A method of simultaneously imaging a vehicle and its license plate when such license plate may or may not be painted with reflective paints and can comprise any number of contrasting colors, the method comprising the steps of:

flood-illuminating a vehicle and its license plate with a non-polarized light sufficient to return a usable visible image from a retro-reflective-paint license plate;

flash-illuminating said vehicle and its license plate with a polarized light sufficient to return a usable visible image from said vehicle and any non-retro-reflective-painted license plate, and providing for a combination of a first light with wavelengths less than 400 nanometers and a second light with wavelengths more than 700 nanometers at the fringes of the visible spectrum to contrast a variety of color combinations used in said license plate;

filtering out any of said polarized light returned from said vehicle and its license plate before it reaches a camera;

imaging said vehicle and its license plate with a camera; and wherein, the non-polarized light is able to provide sufficient illumination for the camera if said license plate is a retro-reflective type.

8. The method of claim 7, wherein:

the step of filtering is such that a polarizing filter is used that is orthogonally oriented to said polarized light.

9. The method of claim 7, wherein:

the step of flood-illuminating uses a white-light light-emitting-diode (LED) array.

10. The method of claim 7, wherein:

the step of flash-illuminating includes the use of a visible-light filter that blocks light with wavelengths in the range of 400–700 nanometers.

11. The method of claim 10, wherein:

the step of flash illuminating includes simultaneously illuminating said vehicle and its license plate with two different colors.

12. The method of claim 7, wherein:

the step of flash illuminating includes using a first non-visible light filter and a second non-visible light filter so two different polarized light colors help contrast said license plate.

* * * * *